(No Model.) 3 Sheets—Sheet 1.

M. G. MERRITT.
TYPE WRITING MACHINE.

No. 421,183. Patented Feb. 11, 1890.

Witnesses:
Robt Smith
Alfred Doyle

Inventor:
Mortimer G. Merritt
By atty. Jacob Felbel

N. PETERS, Photo-Lithographer, Washington, D. C.

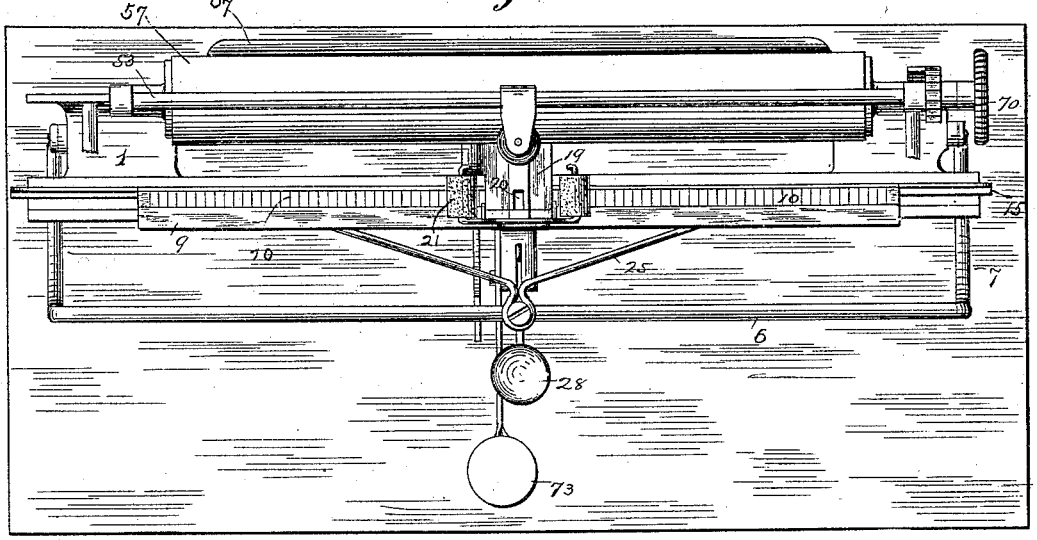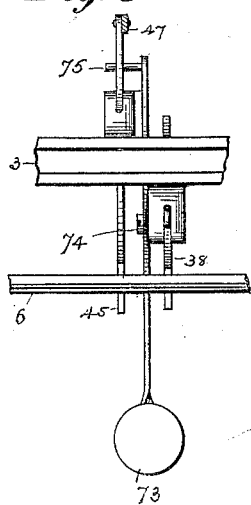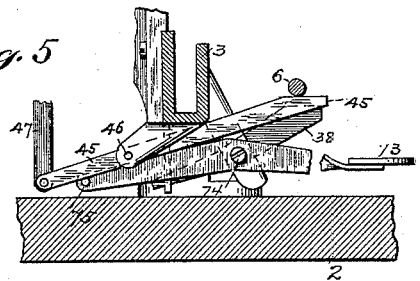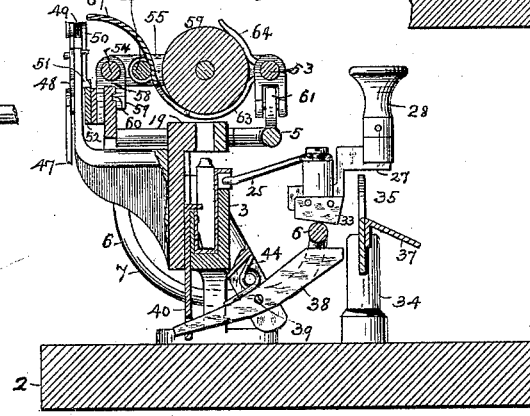

(No Model.) 3 Sheets—Sheet 3.
M. G. MERRITT.
TYPE WRITING MACHINE.
No. 421,183. Patented Feb. 11, 1890.
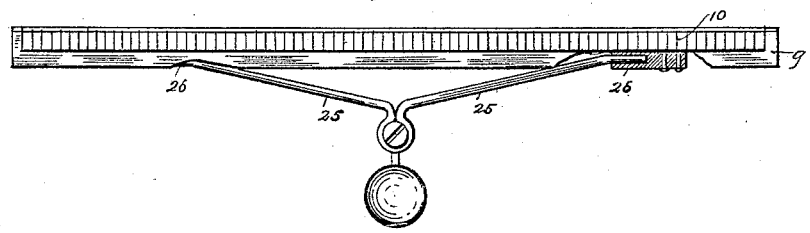
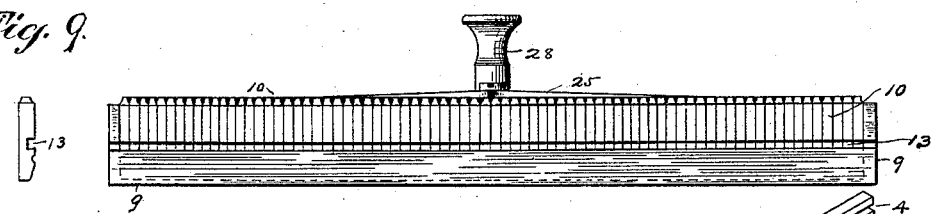
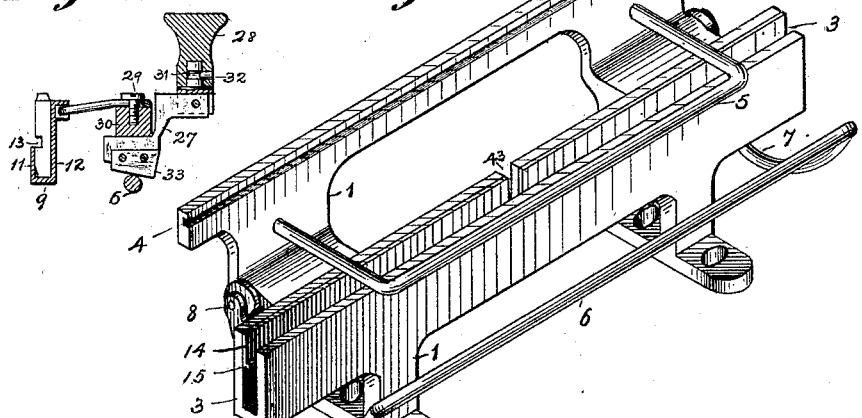
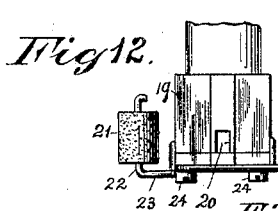
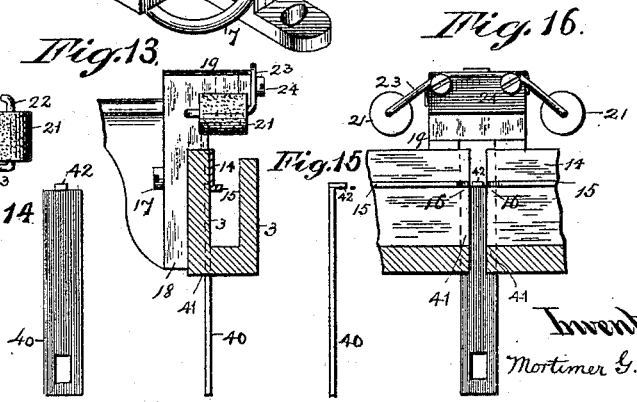
Witnesses:
Robt Smith
Alfred Doyle
Inventor:
Mortimer G. Merritt
By atty Jacob Felbel

UNITED STATES PATENT OFFICE.

MORTIMER G. MERRITT, OF SPRINGFIELD, MASSACHUSETTS, ASSIGNOR TO THE MERRITT MANUFACTURING COMPANY, OF SAME PLACE.

TYPE-WRITING MACHINE.

SPECIFICATION forming part of Letters Patent No. 421,183, dated February 11, 1890.

Application filed December 28, 1888. Serial No. 294,860. (No model.) Patented in England April 5, 1889, No. 5,860; in France April 16, 1889, No. 197,529; in Belgium April 16, 1889, No. 85,850; in Spain June 3, 1889, No. 9,490, and in Canada October 28, 1889, No. 32,624.

*To all whom it may concern:*

Be it known that I, MORTIMER G. MERRITT, a citizen of the United States, and a resident of Springfield, in the county of Hampden and State of Massachusetts, have invented certain new and useful Improvements in Type-Writing Machines, of which the following is a specification.

The following Letters Patent have been obtained in foreign countries: Great Britain, April 5, 1889, No. 5,860; France, April 16, 1889, No. 197,529; Belgium, April 16,1889, No. 85,850; Spain, June 3, 1889, No. 9,490; Canada, October 28, 1889, No. 32,624.

My invention has for its main objects the production of a small, cheap, durable, and efficient type-writing machine; and it consists of the various features of construction and combinations of devices hereinafter more fully described, and particularly pointed out in the appended claims.

Figure 1:
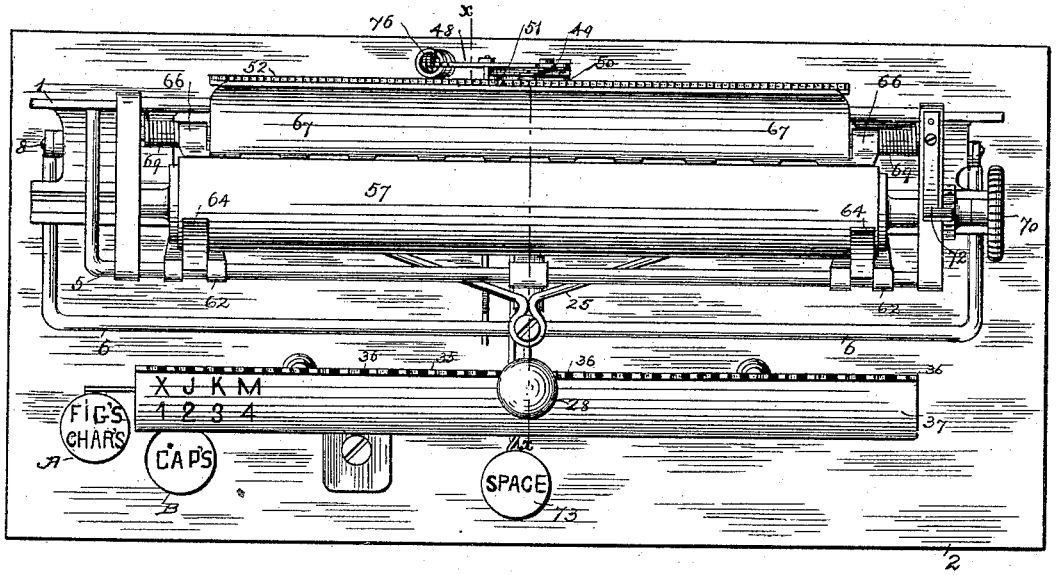
Figure 2:
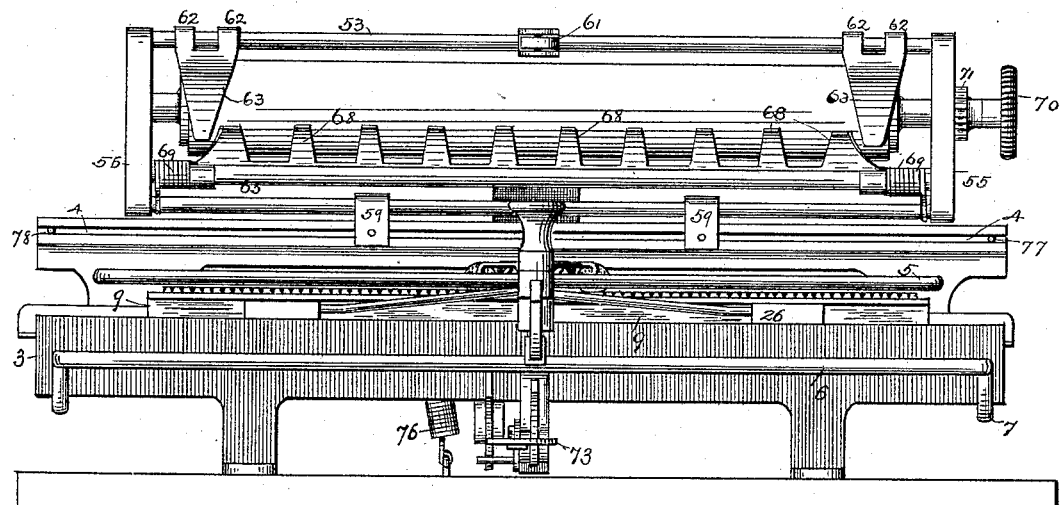

In the accompanying drawings, Figure 1 is a top or plan view of a type-writing machine embodying my invention. Fig. 2 is a front elevation of the same with the paper-carriage lifted to a vertical position and the key-board, &c., omitted. Fig. 3 is a top or plan view of the machine in the condition illustrated at Fig. 2. Fig. 4 is a central vertical section taken at the line $x\,x$, Fig. 1. Fig. 5 is a side detail view to show more particularly the carriage-feeding and type-ejecting levers. Fig. 6 is a detail top view of the same. Fig. 7 is a top plan view of the type-carrier and its handle. Fig. 8 is a rear view of the same. Fig. 9 is a side elevation of a single type. Fig. 10 is a vertical section of the type-carrier, its handle, and the universal bar. Fig. 11 is a perspective view of the main-frame casting with the carriage-supporting rail and universal bar in position. Fig. 12 is an enlarged top view of the type-guide and inking-rollers. Fig. 13 is an enlarged vertical section of the same with the type lifter or ejector added. Fig. 14 is an enlarged front elevation of the type-lifter. Fig. 15 is a side elevation of the same. Fig. 16 is a front elevation of the parts shown at Fig. 13.

In the various views the same part will be found designated by the same numeral of reference.

1 represents the main frame, which is preferably cast in one piece and mounted upon a bed or base plate 2.

3 designates a trough or channel, and 4 a groove formed in said casting and hereinafter referred to.

5 is the front paper-carriage-supporting rail, which is bent at its ends and riveted or otherwise secured to the casting.

6 is the universal bar, extending in front of and parallel with the casting and provided with curved side arms 7, which are preferably pivoted at 8 at the rear of said casting, in order that the universal bar may have the required amount of motion to effect the feed of the paper-carriage.

9 represents the type holder or carrier, which is box-like in form, and 10 the series of individual type contained therein. The type-carrier is made with parallel sides 11 and 12 and sufficiently long to receive side by side the number of type it may be desired to provide the machine with. The rear side or wall 11 of the type-carrier does not extend up as high as the front side 12. Each type of the series employed is formed with a transverse groove 13 at its rear side, which stands just above the upper edge of the wall 11. These grooves are all at the same height from the bottom of the type, and when the latter have been assembled in their holder 9 the groove runs continuous and in a straight line from one end of the body of type to the other, as seen at Fig. 8.

Within the trough or guide 3 and to the rear wall thereof is soldered or otherwise secured a plate 14, which is provided with a horizontally-arranged flange 15, extending the whole length of the guide, but broken away at about its middle, as seen at 16, Fig. 16, for a purpose to be presently explained. The guide 3 is of a width to accommodate the type-carrier and permit it to be slid freely longitudinally therein.

The type-carrier is fitted into the guide by an endwise movement, and as it is passed thereinto the flange 15 enters the the continuous groove 13 in the type, and thereafter serves to hold them in the carrier at the proper level for inking and against falling out should the machine be inverted.

At the rear side of the carrier-guide 3 and at the center of the machine is fastened by screws 17 a plate 18, provided with a forwardly-extending portion 19, which overhangs the type 10 in the carrier. This overhanging portion 19 is provided with an opening 20 about the same in size and contour as the body of a type, and serves to guide the type in their movements to effect the printing.

On each side of the type-guide is arranged an inking-roller 21, mounted to revolve on an axle 22, which is made integral with a wire spring 23, fastened to the type-guide by a screw 24, by which the inking-roller is caused to press upon the type-faces under tension and properly ink the same. The inking-rollers may have their axles obliquely arranged, as in printing-presses, and be thus caused by the action of the type to travel along as well as rotate upon their shafts, thus utilizing the entire inking-surface of the rollers and preventing the formation of grooves or circular depressions therein by the row of type.

To the front of the type-carrier is attached a handle or means for moving the type-carrier back and forth in its guide. This means consists, preferably, of a wire rod bent angularly to form arms 25, which are jointed or pivoted at their ends in bearings 26 on said carrier. To this rod is connected a finger-piece 27, provided with a button or head 28, a screw 29, taking into a hub 30 of the finger-piece, being the immediate means of attachment. The button or head 28 is mounted upon a stud provided with a circular groove 31, and a pin 32 is passed through said head and is arranged to have its point occupy said groove, whereby the head may be freely rotated upon its support without detaching therefrom. On the under side of the finger-piece is arranged a bar or narrow plate 33, which rests upon the universal bar 6, and which is adapted to actuate the same.

At the front of the machine and mounted in suitable posts or supports 34 is a vertically-arranged bar formed with teeth 35, which are pointed at the center and beveled outwardly and downwardly for a short distance and thereafter formed with parallel sides. Between said teeth are spaces 36 for the passage therein of the outwardly-extending arm of the finger-piece bearing the button or head. The teeth and slots are formed in the bar for about one-half of its width, or are made deep enough to allow sufficient depression of the handle to actuate the impression and feeding devices.

To the front of the toothed or index-bar is attached an inclined plate or key-board 37, bearing letters, numerals, &c., corresponding to the type employed.

I have shown the type-carrier provided with seventy-eight type 10 and the index-bar with twenty-six slots or spaces, or one-third of the number of type. According to an invention of Charles E. Merritt, (who will file an application simultaneously with this,) wherein shift-keys A and B are employed, it has been ascertained how to employ seventy-eight type with an index-plate having only twenty-six slots or depressions, and since the machine herein illustrated embodies in practice the said invention I have elected to preserve this general arrangement in the present application without showing the details of the invention of the said Charles E. Merritt. So far as my improvements are concerned, they may be embodied in a machine containing the Charles E. Merritt invention, or in one in which the index-plate is provided with seventy-eight slots, or one for each type character employed.

Beneath the universal bar is arranged a lever 38, which is pivoted at 39 to the framework. To the rear end of this lever is connected a vertically-arranged type ejector or lifter 40, which slides in grooves or ways 41 in the plate or bracket 18, and which is provided with a forwardly-projecting finger or lug 42 at its upper end that works up and down in a slot or opening 43, provided at the middle of the rear wall of the type-carrier guide or trough. This finger or lug 42 stands normally in the plane of the flange 15 and in the continuous groove of the type, and is adapted to raise and lower that particular type with which it may be in engagement at the time of depression of the lever 38, which latter may be provided with a spring, as 44, for returning it to its first position. Immediately below the universal bar 6 is arranged a lever 45, fulcrumed at 46, and pivoted at its rear end to a connecting-rod 47, whose upper end is attached to a bell-crank lever 48, connected by a link 49 to a slotted plate 50, carrying a feed-dog 51, which co-operates with a rack 52, attached to the paper-carriage.

The feed mechanism herein shown and described in a general way is not my invention, but that of Frank A. Young, whose application for Letters Patent will be filed simultaneously with this. Said feed mechanism is now in use in machines embodying my improvements, and for that reason, principally, is shown in this application; but so far as my invention is concerned any suitable means for feeding the paper-carriage may be used in lieu of that shown.

The paper-carriage is composed of front and rear rods, numbered, respectively, 53 and 54, and end bars 55 and 56, in which latter is journaled to rotate the usual rubber-covered platen or impression-cylinder 57. The back rod 54 is mounted to turn in bearings or yokes 58, to the rear sides of which is fastened the feed-rack 52. These yokes are provided in front with downwardly-extending portions 59, having rearwardly-projecting lugs or pins 60, which are fitted to slide in the groove 4 in the casting or main frame, and thus guide the carriage at its rear side as well as prevent any rotation of the yokes and feed-rack. The front rod 53 of the carriage is provided with a small wheel or roller 61, which travels upon the guide-rail 5 and supports the front side of the carriage. Said rod is also provided near each end with paper-guides, each made from a single piece of metal and bent to partially surround the platen above and below the front rod 53. Each of said paper-guides is formed with two hooks 62, (which are soldered or otherwise secured to the rod 53,) with a downwardly and rearwardly extending plate 63, and with an upwardly and rearwardly projecting plate or arm 64, which plates serve to guide the side edges of the paper being written upon up, over, and rearwardly of the platen during the rotation of the same.

Near the back carriage-rod and between it and the platen is arranged a rod 65, which is fastened to the end bars of the carriage-frame. Upon this rod 65 is mounted a combined paper-table and pressure bed or plate. These devices are preferably made of one sheet or piece of metal cut out to provide eyes or bearings 66 for the accommodation of the rod 65, which serves as a pivot or pintle for said combined paper-table and pressure-bed.

The paper-table is marked with the numerals 67 and the pressure-bed with 68. The former extends upwardly and rearwardly of the rod 65, and the latter downwardly and forwardly thereof and in contact with the platen. Coiled springs 69 are provided to force the pressure-plate hard against the platen, in order that when paper is introduced between the platen and the pressure-plate it may be held forcibly between the two and prevented from moving out of position accidentally, and at the same time be capable of being fed or carried forward or backward by simply rotating the platen. The pressure-plate is preferably cut out to form a series of fingers, as shown, but may, if desired, be left solid or continuous.

The platen shaft or axis is provided with a knurled hand-wheel 70 for convenience in rotating the platen and with a notched wheel 71, with which engages a spring dog or check 72 for holding the platen during the time of writing. The notches in the wheel 71 are made rounded or curved, and the under surface of the dog is made to correspond, so that the platen may be turned against the same in either direction by the hand of the operator.

At the front of the machine is provided a space-key 73, which is a lever pivoted at 74 and extending rearwardly to near the connecting-rod 47, where it is provided with a transverse pin 75, which underlies the rear end of the lever 45, and is adapted to raise the same and actuate the feed mechanism when the button or head of the space-key is depressed.

To the bell-crank lever 48 is connected one end of a coiled spring 76, whose other end is attached to the base-plate 2. This spring is stretched when the rear ends of the levers 74 and 45 are elevated, and by its tension or recoil serves not only as the driving-power of the feed mechanism, but also to return the parts thereof and the said levers 74 and 45 to first position.

By depressing the space-key the dog 48 is raised from the rack and the carriage may be slid to the right or left rapidly, being guided in its movements by the groove 4 and track 5. In order to prevent the casual detachment of the carriage in either direction of its movement, stops 77 and 78 are placed at the extremities of the groove 4, against which the yoke, lugs, or pins 60 are adapted to strike.

The operation of the machine is as follows: Paper is placed upon the platen by passing it down between the paper-table and the platen until the leading edge of the sheet is stopped by the forward ends of the pressure-fingers, which normally press against the platen at their tips or free ends. The platen is then rotated and the paper clinging thereto is fed forward against the pressure of the fingers to the desired extent. The pressure-fingers being made integral with the paper-table, (which stands away from the platen,) and curving therefrom down and under and against the platen for its whole length, form a perfect guide for the introduction of the paper to printing position. In manifolding, or where a number of sheets of paper are placed in the machine, the operator should pull forward slightly upon the upper portion of the paper-table, and thus throw the pressure-fingers back or away from the platen against the tension of the coiled springs, the combined paper-table and pressure-fingers vibrating as a lever from the rod 65 as a pivot or fulcrum. While thus vibrated the paper may be introduced to position, and the paper-table then released to allow the pressure-fingers to press against the pile to hold the same and to assist in the line-space feeding thereof. The paper having been arranged in place, the printing may be proceeded with. The operator, grasping the handle of the type-carrier, may move the latter back or forth in its guideway until the type which it is desired to print shall have been brought opposite to or in line with the guide-opening 20. The lever 38 is then to be actuated to lift or project such type from its carrier through the guide-opening and impress the ink thereon) previously obtained from its movement under and against the inking-rollers) upon the paper partially surrounding the platen. As the rear end of the lever 38 is raised, the lifter or plunger 40 is slid upward in its guideways, and the finger or projection 42, which lies within the groove 13 in the type to be actuated, is caused to force said type out beyond its fellows through the guide and impress its face against the paper. Upon releasing the pressure upon the lever 38 the spring 44 operates to return it to normal position, thereby effecting also the recession of the ejector and the type with which it is in engagement. Each type is beveled on one side, as shown, in order that it may readily return to its place in the carrier. As the type stand side by side and close together, the ejection of one type has a tendency to raise by friction the type on opposite sides thereof, which, if permitted to occur, would be detrimental to the operation of the machine and the life of the type. This tendency of the contiguous type to move with the one selected is prevented effectually by the flange 15, running lengthwise of the carrier guideway and extending to the opening 43 therein on both sides. The lever 38 is preferably actuated by the handle through the universal bar; but it may be operated directly or by a depression of the universal bar independent of the handle. The desired type is readily brought to position for printing by the employment of the key-board 37, which is marked or arranged with relation to the arrangement of the type in the carrier, so that when the finger-piece of the handle is brought in line with any character marked on the key-board the same type character is brought to the center of the machine at the printing-point. The characters are marked on the key-board opposite the notches or depressions 36, and when the finger-piece or key of the handle has been carried to the desired character on the key-board the handle may be depressed and the finger-piece or key pushed into the notch in register with such character, thus locking the type-carrier in position and insuring the printing of the desired type only. When the handle is depressed, the plate or heel 33 forces down the universal bar, which in turn actuates the type-ejecting lever 38. When the universal bar is pushed down, the lever 45 is also vibrated, and through the various connections shown and described the feed-dog is raised from the rack and moved back or to the right one letter-space. After the type-impression has been made and the pressure upon the universal bar has been released, the spring 76 carries the dog forward, feeds the paper-carriage one letter-space, and returns the parts in connection with it to their first positions. The spacing between words may be effected by the key 73.

Numerous changes in detail construction and arrangement may be made without departing from the spirit of my invention.

What I claim as new, and desire to secure by Letters Patent, is—

1. In a type-writing machine, the combination of a straight longitudinally-arranged trough or channel 3, having a slot or opening 43 at about the middle of one of its walls, a type-carrier fitted to slide endwise in said trough or channel and provided with a row of independent printing-type, and a type-ejector arranged to slide in ways or guides in said trough or channel in line with said slot or opening 43, and adapted to move therein and project said independent type as they are successively brought into alignment or register therewith.

2. In a type-writing machine, the combination of a straight longitudinally-arranged trough or channel having a slot or opening 43 at about the middle of one of its walls and provided with a flange 15, cut away at said slot or opening, a type-carrier fitted to slide endwise in said trough or channel and provided with a row of independent printing-type, each having a groove, as 13, receiving said flange, and a type-ejector arranged to slide in ways or guides in said trough or channel in line with said slot or opening, and adapted to engage with the grooves in said type and project the type as they are successively brought into alignment or register therewith.

3. In a type-writing machine, the combination of a straight longitudinally-arranged trough or channel, a type-carrier adapted to slide endwise therein and provided with a pivoted or jointed handle, a letter-spacing mechanism, including a universal bar 6, arranged parallel with the path of movement of the type-carrier and adapted to be actuated by said pivoted or jointed handle, a type-ejector, and a lever for moving the same extending out in the path of vibration of the universal bar 6.

4. In a type-writing machine, the combination of a longitudinally-arranged guideway, as 3, provided with a horizontal flange, as 15, a type-carrier fitted to slide endwise in said guideway and provided with a row of printing-type, each of which is formed with a groove, as 13, and a type-ejector for engaging the said grooves of the type arranged to slide in ways or guides in line with the printing or impression point of the machine.

5. In a type-writing machine, the combination of a straight guideway, a type-carrier fitted to move endwise therein, having a pivoted forwardly-extending handle and having a row of printing-type, each of which is provided with a groove, a flange, as 15, arranged within the continuous groove formed in said row of type, and a sliding type-ejector.

6. In a type-writing machine, the combination, with a guideway having a slot or opening, as 43, at about the middle of its length, of a type-carrier fitted to slide therein and having a row of independent printing-type, each provided with a groove, a type-ejector adapted to slide within the slot or opening 43 and to engage the groove of any one of said type as it is brought into line with said opening by the back and forth movements of the type-carrier.

7. In a type-writing machine, the combination of a guideway having a slot or opening, as 43, a type-carrier adapted to slide endwise therein and having a row of independent printing-type, a type-ejector arranged to slide in guides or ways at said slot or opening, and a lever for actuating the type-ejector, and a universal bar, as 6, for operating the type-ejector lever.

8. In a type-writing machine, the combination of a guideway, a type-carrier arranged to slide endwise therein and having a row of independent printing-type and a pivoted or jointed handle, a universal bar, as 6, parallel with the guideway and the type-carrier and arranged beneath said handle and connected with the carriage-feed mechanism, a type-ejector, and a lever for operating the same extending out and beneath the universal bar in a manner to be actuated thereby at each stroke or depression of said handle.

9. In a type-writing machine, the combination of a guideway, a type-carrier arranged to slide endwise thereof and having a row of independent printing-type and a pivoted or jointed handle, a type-ejector, a lever for actuating the same operated by the movement of said pivoted handle, and an index-bar independent of said lever and at right angles thereto adapted to be engaged by said handle, and to thus maintain the type-carrier in a locked or rigid position during the ejection of the type.

10. In a type-writing machine, the combination of a straight longitudinally-arranged guideway, a type-carrier fitted to slide endwise therein and having a row of independent printing-type, a sliding type-ejector, and an overhanging type-guide provided on each side with an inking-roller adapted to ink the type as the carrier is slid back and forth in its guideway.

11. In a type-writing machine, a sliding type-carrier 9, provided with parallel sides or walls 11 and 12 and containing a row of printing-type, each provided with a groove arranged above or beyond the wall 11 of the carrier, in combination with an ejector extending over the wall 11 to engage with the grooves of the type.

12. In a type-writing machine, a straight sliding type-carrier 9, provided with parallel walls 11 and 12 of different heights and containing a row of printing-type, each having in its body a groove at the same height, so as to present a continuous groove along the entire row above or beyond the wall 11 of the carrier, in combination with an ejector extending over the wall 11 to engage with the grooves of the type.

13. In a type-writing machine, the combination of a solid rail having a groove 4 on one side, yokes 58, having studs engaging the said groove, and a paper-carriage hinged or pivoted to said yokes.

14. In a type-writing machine, the combination of a guideway, a type-carrier adapted to slide endwise therein and having a row of independent printing-type, a handle pivoted or jointed to said type-carrier, the paper-carriage, the carriage-feeding mechanism, the universal bar 6, extending parallel with said type-carrier and the whole length of the machine, the type-ejector arranged at the center of the machine, and the lever for operating the same arranged beneath the universal bar, whereby at each depression of the said handle a type is projected against the paper on the platen and at each releasement of said handle the platen and paper are fed one letter-space to the left.

15. In a type-writing machine, the combination of the paper-carriage, the feeding mechanism, the guideway, the type-carrier fitted to slide therein and having a row of independent printing-type, the type-ejector, the lever for operating the same, the universal bar above said lever and extending the whole length of the machine, the pivoted or jointed handle connected to the type-carrier and arranged above the universal bar, an index-bar arranged parallel with the universal bar, and a key on said handle for engaging said index-bar, whereby at each depression of said handle the type-carrier is locked against endwise movement and a type is projected against the paper on the platen, and at each releasement or return of said handle the type-carrier is unlocked to be freely slid in its guideway and the paper-carriage is fed to the left a letter-space distance.

Signed at New York city, in the county of New York and State of New York, this 14th day of December, A. D. 1888.

MORTIMER G. MERRITT.

Witnesses:
JACOB FELBEL,
EDWIN C. DUSENBURY.